Feb. 3, 1959 E. M. BATTEY ET AL 2,872,149
QUICK-ACTING RELEASE VALVE
Filed April 20, 1953 3 Sheets-Sheet 1

United States Patent Office 2,872,149
Patented Feb. 3, 1959

2,872,149

QUICK-ACTING RELEASE VALVE

Everett M. Battey, Alexandria, Va., and Ilya S. Livney, Tucson, Ariz., assignors to Infilco Incorporated, Tucson, Ariz., a corporation of Delaware Application April 20, 1953, Serial No. 349,878

2 Claims. (Cl. 251—25)

This invention relates to a quick-acting, leakproof, pressure release valve. The valve of this invention is particularly suitable for the quick release of air from a diatomite filter in the so-called air-bump washing of such filters and will, therefore, be described in connection therewith. However, it should be understood that the valve is useful beyond this specific application, wherever it is necessary to quickly relieve a gas pressure in a tank and to provide a reliably gas-leakproof valve.

In the air-bump washing of diatomite filters, a body of air, the so-called release air, is compressed within a suitable air trap in the filter, such as, for example, under an element supporting plate which separates the inlet chamber of the filter from the outlet chamber, as shown, for example, in Booth, Patent No. 2,423,172, and Pew, Patent No. 2,468,603, or, as shown in copending application Serial No. 337,089, now Patent No. 2,834,473, under the top of the filter.

A second body of air, the so-called operating air, is compressed in the filter in a second air trap downstream of the first air trap, such as under the top of the filter, as shown in the said Booth and Pew patents, or within the elements, as shown in said copending application.

Air-bump washing is initiated by opening a quick-acting valve on the air release port of the filter to connect the air release space to atmosphere. The sudden release of the body of release air results in a rapid expansion of the operating air, which drives the liquid upstream of the second air trap with tremendous velocity back through the filter elements, breaking off the coat of filter aid deposited thereon and washing the elements free of filter aid material and dirt. Immediately after opening the air release valve, the drain valve is opened, so that the wash water and washed out dirt and filter aid material can be withdrawn.

To obtain the necessary acceleration of the wash liquid, the expansion of the operating air must be almost explosion-like; this, in turn, requires an instantaneous escape of the entire body of release air, once release is started. An air release valve used in air-bump washing must, therefore, be capable of completing its opening with a snap action after the valve is very slightly cracked open. On the other hand, the valve must be entirely gas-leakproof, to prevent the escape of the release air during the filter run. Quick-acting valves available on the market and heretofore used in air-bump washing have not been found entirely satisfactory, as they open too slowly to permit a truly instantaneous escape of the release air, and also due to a tendency to gas leakage.

It is an object of this invention to provide an improved quick-acting release valve.

Another object is to provide a valve of the type referred to which completes its opening with a snap action once the valve is only slightly cracked open.

Another object is to provide a release valve for a pressure tank which is held in closed position by the internal pressure of the tank and which is opened by snap action immediately upon a slight decrease in the internal pressure.

Another object is a release valve for a pressure tank wherein the power for holding the valve in closed position and for opening the valve is derived from a body of gas compressed in the tank.

Other objects will become apparent upon consideration of the detailed description and of the claims which follow.

To provide for the desired snap action in the opening of the valve, we utilize means capable of storing energy when under a load and apply thereto a load acting in valve opening direction. We also provide means preventing the release of the stored energy until the valve is slightly cracked open, and then releasing the energy, whereby the valve opening is completed practically instantaneously. The energy storing means may take various forms, such as a spring or a confined body of gas.

In one form of the invention, both the initial unseating of the valve disk and the completion of the valve opening are effected by the energy storing element. In another form of the invention, only the completion of the valve opening is accomplished by the energy storing member, while the initial unseating of the valve disk is effected by a force acting on a different element.

The invention will be more readily understood by reference to the drawings which form a part hereof and wherein similar elements are designated by like reference characters.

In the figures the release valve is shown supported by a wall 10 wherein an air release port 11 is formed. The wall 10 may be the end portion of a conduit leading from the release air space of a filter arranged in the manner of said Booth and Pew patents, or it may be the top of the filter tank, and a release air trap 12 may be located below the wall 10, as shown herein and as described in said copending application Serial No. 337,089. The wall 10 is provided with a flange 13 surrounding the port 11.

Figure 1:
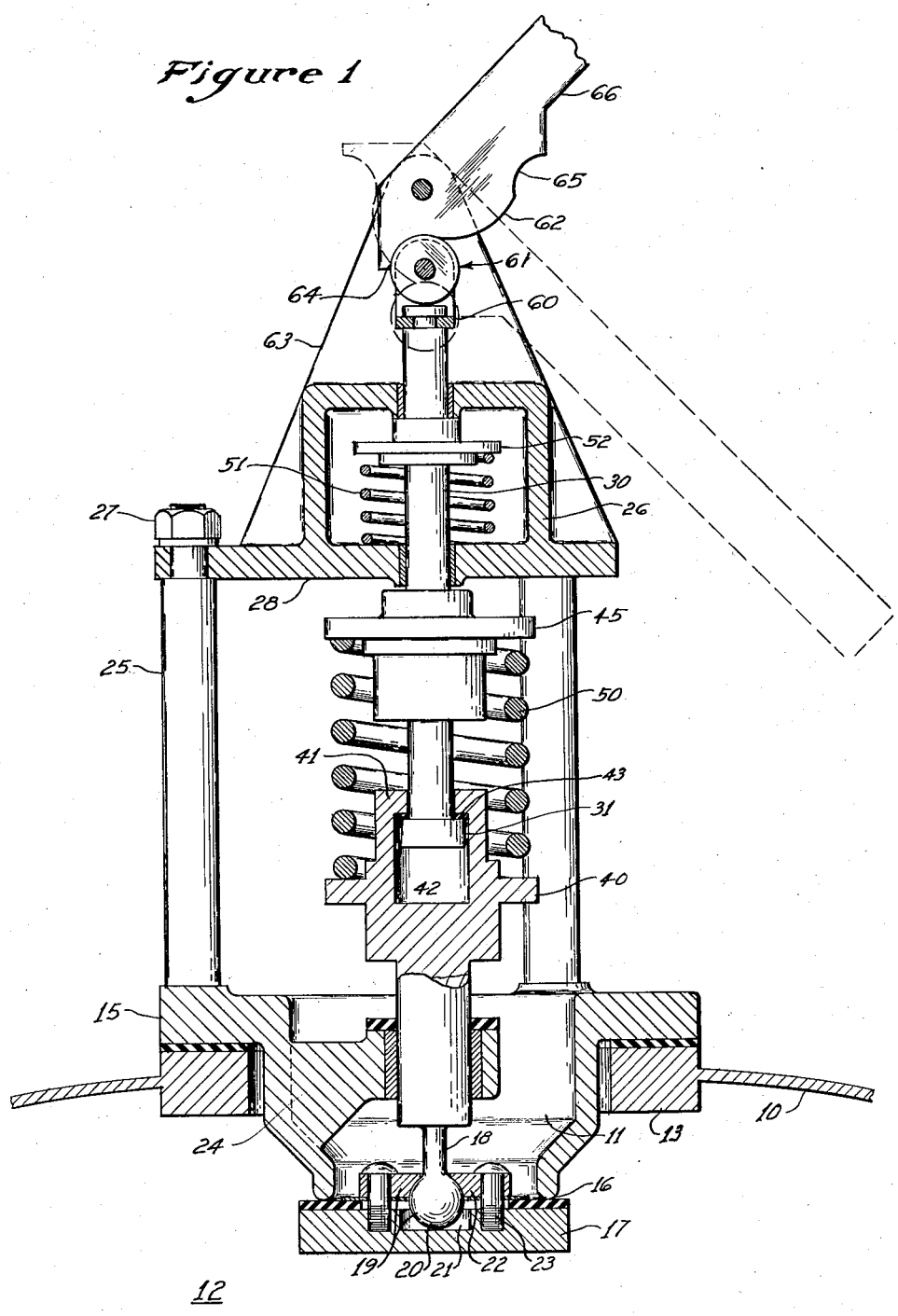
Figure 1 is a vertical cross-sectional view of a valve according to the invention.

The valve shown in Figure 1 comprises an annular casting 15 affixed to the flange 13 and extending downwardly through the port 11. The lower end of the casting is shaped to form an annular valve seat 16. A flat valve disk 17 is normally held against the seat 16 by the internal pressure of the filter to seal the port 11. The disk 17 may be made of any suitable material, such as brass, with a face of rubber or similar resilient material. A valve stem 18 is loosely connected with the disk 17 by a swivel joint 19. The ball 20 of the joint 19 is retained in a central depression 21 in the disk 17 by an annular ball seat 22 affixed to the valve disk 17 by any suitable means, such as screws 23. The inner periphery of the ball seat is shaped to conform to the ball 20. The stem 18 passes through a central opening in the ball seat 22 and is supported in a suitable bearing by a spider 24, which may be integral with, or affixed to, the casting 15.

Mounted on the casting 15 are studs 25, which support a spring casing 26, fastened thereto by screws, such as shown at 27, extending through the bottom plate 28 of the casing 26. A push rod 30 extends through central openings in the top of the spring casing 26 and its bottom plate 28, respectively. At its lower end the push rod 30 has an enlarged portion 31.

A spring seat 40 may be rigidly affixed to, or, as shown, integral with the valve stem 18. The seat 40 has an annular portion extending upwardly beyond the upper end of the stem 18, with an upper inwardly extending annular flange 41, whereby a chamber 42 is formed within the spring seat 40.

The lower end of the push rod 30 extends into the chamber 42, the flange 41 leaving an opening of sufficient size to provide clearance between the flange and the push rod 30. A suitable gasket 43 is provided at the lower side of the flange 41 to prevent wear due to contact between the enlarged portion 31 of rod 30 and the flange.

A second spring seat 45 is rigidly affixed to a lower portion of the push rod 30 below the plate 28 and spaced above the lower spring seat 40. A compression spring 50 is seated in the spring seats 40 and 45. A light spring 51 is seated with one end against the upper face of the plate 28 and with the other end in a spring seat 52 attached to the portion of the push rod 30 which is movable within the spring casing 26.

Figure 2:
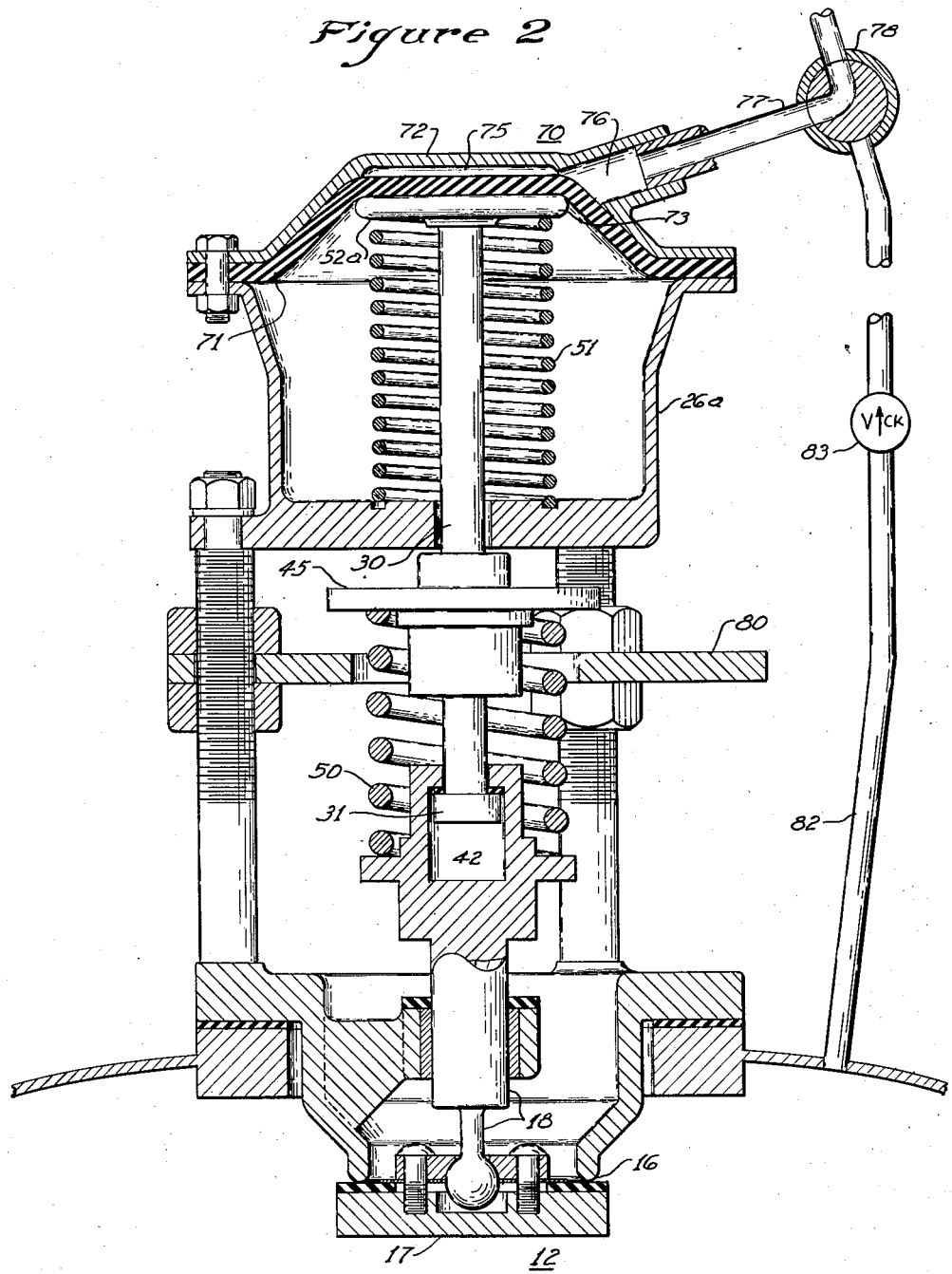
Figure 2 is a vertical cross-sectional view of a modification of the valve of Figure 1.

Any suitable means can be used to depress the push rod 30, such as the air motor shown in Figure 2. In the embodiment of Figure 1 a cam and lever arrangement is shown for purposes of exemplification. The push rod 30 carries a fork 60, in which rides a roller 61. A cam 62 is supported on the plate 28 by arms 63 for engagement with the roller 61. The cam 62 is provided with slight depressions 64 and 65 arranged adjacent its opposite ends and corresponding with the portions of the cam engaging the roller at the beginning and at the end of the stroke of the push rod, whereby the rod 30 is held in its end position. A lever 66 may be affixed to the cam 62 or be integral therewith.

The operation of the valve will be readily understood. During the filter run, the movable parts of the valve are in the position shown in Figure 1, and the valve disk 17 is firmly held against the valve seat 16 by the pressure in the filter, effectively sealing the port 11 against leakage of air.

To initiate the air-bump washing, the lever 66 is depressed, manually or by any other suitable means. As the lever moves downwardly from the position shown in full lines in Figure 1, the cam 62 depresses the roller 61 and push rod 30 until the end position shown in dotted lines in Figure 1 is reached by the cam and lever when the roller is retained in the depression 65.

As the push rod moves downwardly, the upper spring seat 45 of the spring 50 moves also down with the rod. The lower spring seat 40, however, remains stationary, as it is affixed to the valve stem 18, whose movement in valve opening direction is counteracted by the pressure in the tank acting on the valve disk 17 in valve closing direction. The spring 50, therefore, is compressed between its seats 40 and 45 and remains compressed until the downward force applied to the stem 18 exceeds the upward force due to pressure in the tank acting on the valve disk 17. When this condition is reached, the valve disk 17 is unseated, and the air compressed in the release air trap 12 begins to escape. The resulting drop in the internal pressure in the filter and consequent reduction in the valve closing force below the value of the spring force of spring 50 releases the energy stored in the spring, and the spring expands instantaneously, carrying down the valve stem 18 and disk 17 and opening the valve with a snap action.

The actual opening of the valve may be completed in different ways, depending on the value of the spring force chosen for the spring 50 and the relationship of the location of the spring seat 45 on the push rod 30 and the extent of travel of the push rod 30, which is controlled by the height of the chamber 42. If the spring force of spring 50 is in excess of the maximum upward force on disk 17 due to pressure of the filter, the extent of travel of the push rod 30 and the location of the spring seat 45 on the push rod 30 may be so proportioned that the extension 31 of the push rod does not contact the lower wall of chamber 42 when the end position of the cam 62 in valve opening direction is reached, and that the spring 50 in said end position of cam 62 is sufficiently compressed to overcome by its force the valve closing pressure. With this construction the spring accomplishes both the unseating of the valve which initiates the valve opening, and the following snap action completion of the valve opening. Alternately, a spring force of less than the maximum force on disk 17 due to pressure in the filter may be chosen for spring 50. In such case the length of the push rod 30 and the depth of the chamber 42 will be so proportioned that the enlarged portion 31 of the push rod bears against the bottom of the chamber 42 in the end position of the cam 62 in valve opening direction, and the spring seat 45 will be located on the push rod 30 so that the spring 50 is nearly completely compressed when the cam 62 reaches this end position. With this construction the valve opening is initiated by the force acting directly on the stem 18 through the push rod 30, the spring 50 snapping the valve fully open as soon as the force on disk 17 due to internal pressure of the filter has dropped below the value of its spring force.

In either construction it is the sudden release of energy stored in the spring 50 which provides the desired snap action opening of the valve, permitting the immediate escape of the entire release air once the valve has been slightly cracked open.

Still another method of opening the air release valve, using a spring 50 having a spring force less than the valve closing force due to the operating pressure of the filter, is to effect a drop in the valve closing force to a value below that of the spring force while the air release valve is held closed. This can be done by opening the drain valve of the filter. As described above, the drain valve usually is opened immediately after the opening of the air release valve, so that the wash water, dirt and filter aid material can forthwith be withdrawn from the filter, and dirt and filter aid material have no chance of settling on the bottom of the filter.

When operating in this manner, the parts of the air release valve will be so proportioned that at the end of the valve opening cam movement, when the roller 61 is retained in groove 65, the spring 50 is nearly fully compressed and the enlarged portion 31 of the push rod 30 is not in contact with the bottom of the chamber 42. Thus, the valve disk 17 remains seated on seat 16, until, by opening of the filter drain valve, the force due to pressure in the filter holding the disk against the seat has dropped to a value below that of the spring force of spring 50, and the energy stored in the spring 50 is released, whereupon the air release valve is snapped open. It will be obvious that this drop in internal filter pressure and the opening of the air release valve occur in such a short time that usually opening of the filter drain valve will not be completed before the air release valve is fully opened. This method of operation, therefore, provides a desirable coordination of the opening of the two valves. It has also the advantage that a smaller force is needed for opening the air release valve.

When washing is completed and fresh filter aid material has been introduced into the filter for forming a new filter coat, the air release valve must be closed to permit trapping of air for the air-bump washing operation during refilling of the filter. At this time, however, no pressure is available in the filter for closing the release valve. To effect its closing, the light spring 51 is provided.

During the downward travel of the push rod, the light spring 51 is compressed by its downwardly moving seat 52 against the stationary plate 28. The spring 51 remains compressed during and after opening of the air release valve, and cannot expand until the lever 66 is raised to release the roller 61 from the groove 65 of the cam 62.

Thus, by providing the depression 65 in the cam 62, the release valve can be held open against the action of the spring 51. After the roller 61 is released from the depression 65, the spring 51 expands and raises the push rod, valve stem and valve disk assembly, the valve stem 18 being raised by the piston 31 bearing against the shoulder formed by the flange 41.

The valve shown in Figure 2 is in all essential parts the same as that of Figure 1 and can be operated in the same manners as described in connection with Figure 1. However, in this embodiment an air motor 70 is used instead of the cam-lever assembly of Figure 1 for depressing the push rod 30 and compressing the springs 50 and 51.

In this embodiment the top of the spring casing 26a is formed by a flexible diaphragm 71 clamped between suitable flanges of the wall of the spring casing 26a and of a bonnet 72. The upper end of the push rod 30 is rigidly affixed to a diaphragm plate 73, which also forms an upper spring seat 52a for the light spring 51, as shown. The bonnet 72 and the diaphragm 71 form the air pressure chamber 75 of the air motor 70.

The bonnet 72 is provided with a port 76 from which leads an air line 77 provided with a three-way valve 78. In one position the three-way valve 78 connects the air pressure chamber 75 to a suitable source of air under pressure, and in another position it vents the air pressure chamber 75 to atmosphere.

When the chamber 75 is vented, the diaphragm 71 and the parts movable therewith are in the position shown in Figure 2. When air under pressure is admitted to the chamber 75, the diaphragm is flexed downwardly, depressing the push rod 30 and the spring seats 52a and 45, thereby compressing the springs 51 and 50.

A stop 80 is shown in Figure 2 which limits the stroke of the air motor. This stop is not used when the air release valve is operated in such manner that the drop in the valve closing pressure in the filter is obtained by unseating the valve disk 17, but the stop 80 is necessary when it is desired to obtain the pressure drop while the valve disk 17 is seated on the seat 16, by opening of the filter drain valve.

When operating in the first named manner, i. e. reducing the valve closing pressure by unseating the valve disk, the downward stroke of the air motor 70 will continue until the valve is cracked open, either by the spring 50, if its spring force is in excess of the valve closing force due to the operating pressure of the filter, or by the enlarged portion 31 of the push rod 30 bearing against the bottom of the chamber 42, as described in connection with Figure 1; whereupon the energy stored in the spring 50 will be suddenly released and the valve snapped open.

When operating in the second named manner, i. e. reducing the valve closing pressure by opening the filter drain valve, the stop 80 is used and limits the stroke of the air motor 70 to a point where the spring 50 is nearly completely compressed (but cannot unseat the valve disk 17 due to its spring force being smaller than the force on valve disk 17 due to pressure in the filter), and the enlarged portion 31 of the push rod 30 does not contact the bottom of the chamber 42. When, upon opening the filter drain valve, the valve closing force due to the internal pressure of the filter is reduced to a value below that of the spring force of spring 50, the energy stored in the spring is suddenly released and snaps the valve open.

The air release valve remains open until the three-way valve 78 is turned to the position in which it vents the air pressure chamber 75, whereupon the light spring 51 closes the valve in the manner described in connection with Figure 1.

The air motor 70 can be operated with air from any suitable source, such as a compressor, not shown. One possible source is the air trap 12 of the filter, which may be connected with the three-way valve 78 by a line such as shown at 82, provided with a check valve 83 permitting flow only in the direction from the air trap 12 to the valve 78. The line 82 may be connected to the air trap 12 in any suitable manner, such as shown, for example, in Figure 2, or in the manner shown in Figure 3.

If air from the filter is used, the diaphragm 71 is subjected to the same pressure as is acting on the valve disk 17. By making the effective area of the diaphragm 71 larger than the valve disk 17, the force on the valve disk 17 in valve opening direction is larger than the force in valve closing direction, so that as the three-way valve 78 is opened, the air release valve almost immediately snaps open. By providing the check valve 83 preventing backflow of air from the air motor to the filter air trap, the drop of pressure in the filter does not affect the air pressure in chamber 75, and the air release valve remains open until the three-way valve 78 is positioned to vent chamber 75, whereupon the spring 51 expands and closes the valve.

Using the air from the filter for operating the air motor 70 in this manner has the advantage of eliminating the need for an outside source of air under pressure. It has the disadvantage that there is no force available for reopening the valve when the valve opening force due to pressure in the tank is below that of the spring force of spring 51.

Figure 3:
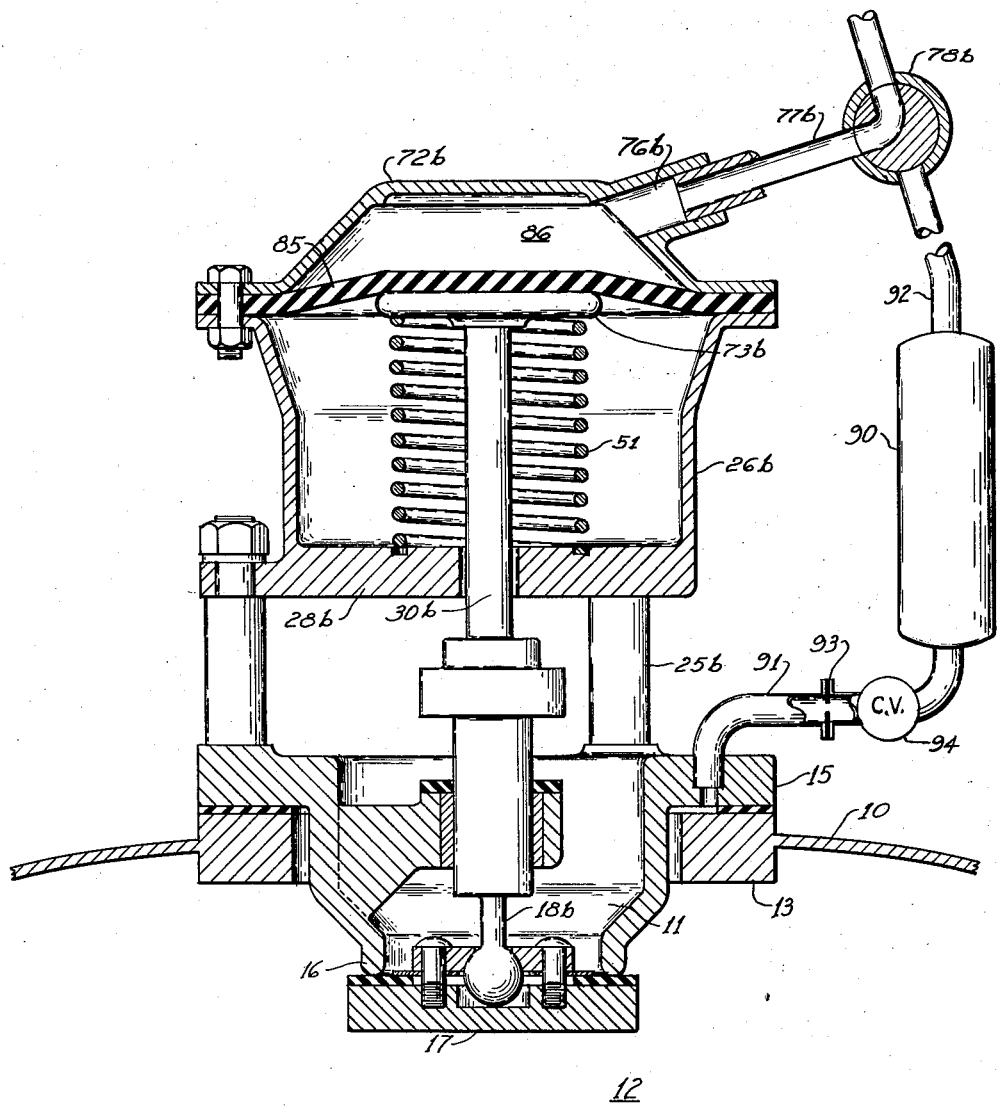
Figure 3 is a vertical cross-sectional view of another embodiment of the invention.

In the embodiment of Figure 3 a confined body of gas is used as the means for storing energy and takes the place of the spring 50 of Figures 1 and 2 in providing the snap action opening of the release valve.

The valve seat 16 and valve disk 17 of this embodiment may be formed and supported in the same manner as in the other figures. However, in this embodiment the valve stem 18b and the push rod 30b are rigidly connected, or may be made integral. The spring chamber 26b is supported in the same manner as in Figure 2, but the studs 25b can be shorter in this embodiment of the invention, as the spring seats 40 and 45 and the spring 50 of the other figures are omitted. The top of the spring casing 26b is formed by a diaphragm 85 which is clamped between suitable flanges of the side wall of the spring chamber and of a bonnet 72b. The upper end of the push rod 30b is affixed to a diaphragm plate 73b which forms also a seat for the light spring 51 which is seated with its lower end against the bottom wall 28b of the spring chamber 26b. The bonnet 72b and diaphragm 85 form a storage chamber 86 for a considerable volume of air under pressure. As in the embodiment of Figure 2, the bonnet 72b has a port 76b which is connected to a source of air under pressure, such as a compressor, not shown, by an air line 77b, provided with a three-way valve 78b.

With the air release valve closed and the chamber 86 vented, the diaphragm 85 assumes the position shown in Figure 3 and provides with the bonnet a relatively large reservoir for air under pressure. When the three-way valve 78b is positioned to admit air under pressure to the chamber 86, the air is compressed in chamber 86, as the rigid connection between the push rod 30b and the valve stem 18b prevents the diaphragm 85 from flexing in response to the air pressure. When the force on diaphragm 85 due to the pressure in the chamber 86 exceeds the force on valve disk 17 due to pressure in the filter, the diaphragm 86 flexes downwardly, depressing the push rod 30b and stem 18b and unseating the valve disk 17, permitting some air to escape from the air trap 12 in the filter. Due to the resulting drop in pressure in the filter, the energy stored in the body of compressed air in the chamber 86 is suddenly released, and the valve snapped open. The valve remains open until the three-way valve 78b is positioned to vent chamber 86, whereupon the spring 51 expands and closes the valve, as described in connection with Figures 1 and 2.

The embodiment of Figure 3 can also be operated with air from the air trap 12 of the filter. When operating in this manner, the simple connection from the air trap 12 to the three-way valve 78 shown in Figure 2 can be used also with this embodiment. However, for purposes of exemplification, in Figure 3 a small air tank 90 is shown connected by a line 91 to the air trap 12 of the filter, and by a line 92 to the three-way valve 78b. The line 91 can lead from any part of the air trap 12, for example in the manner shown in Figure 2, but is preferably extended through the flange of the casting 15 of the air release valve, as shown. The gasket between the casting 15 and the flange 13 of the filter is cut away to connect the line 91 with the air trap 12 through the space between the flange 13 and the lower portion of the casting 15. This construction permits removing the air release valve and its operating parts as a unit from the filter. A small orifice 93 is provided on line 91. With this construction some air from the air trap 12 will be displaced through line 91 during the filling of the filter, and will be trapped in the tank 90 under the pressure prevailing in air trap 12 as long as the three-way valve 78b closes line 92. Opening of the air release valve is effected in the same manner as in the embodiment of Figure 2. When the three-way valve 78b is positioned to connect line 92 to the air pressure chamber 86, the diaphragm 85 is subjected to the same pressure as is acting on valve disk 17, and by making the effective area of diaphragm 85 larger than the disk 17, the valve snaps open. As soon as the pressure in the filter drops below the pressure in tank 90, the air starts bleeding back therefrom into the filter, but by providing the small orifice 93 the pressure in the tank 90, and therefore also in chamber 86, drops only slowly, permitting complete escape of the air from trap 12 before the air release valve is closed by spring 51. This embodiment provides automatic closing of the air release valve after a period which can be predetermined by proportioning of the orifice 93.

Instead of the orifice 93 a check valve, such as shown at 94, can be used on line 91. Such a check valve will prevent backflow of air from tank 90 to the air trap 12, so that the air release valve does not close automatically, as with the use of an orifice, but stays open until the chamber 86 is vented by positioning of three-way valve 78b. However, using a check valve in connection with the tank 90 has the advantage that sufficient air under pressure will be left in the tank 90 after one operation of the air release valve to provide a force for reopening the valve against the force of spring 51 at a time when no valve opening force due to pressure in the filter is available. This is desirable, for example, for introducing the filter aid material into the filter prior to filtering, and obviates the need of an additional vent for the filter. The air tank 90 can also be used in connection with the embodiment of Figure 2, to provide a force for reopening the air release valve.

It will be seen that by providing means capable of storing energy when under a load such as the spring 50 of Figures 1 and 2, or the body of compressed air in the chamber 86 or in air tank 90 of Figure 3, the release valve is opened by snap action as soon as the valve opening force applied to the valve disk 17 only slightly exceeds the valve closing force acting thereon. Without such sudden release of stored energy, the valve would open only gradually, too slowly for proper operation of an air bump wash.

While various means of initiating the valve opening have been described, they have all in common that they effect a momentary drop in the valve closing force below the value of the valve opening force which results in the sudden release of the stored energy.

We claim:
1. A quick-acting gas release valve mounted on a pressure tank containing a body of gas under pressure and having a release port, said valve comprising a valve seat, a valve disk normally held against said seat by the pressure in said pressure tank, and, when seated on said seat, sealing said port, first means capable of storing energy when under a load and operatively connected with said valve disk to move said disk with a snap action in valve opening direction by release of its stored energy, said first means including a diaphragm, and wall means forming with said diaphragm a chamber adapted for selective connection to a source of gas under pressure and to atmosphere, second means adapted to selectively apply a pressure to said valve disk in valve opening direction and simultaneously load said energy storing means to a predetermined degree or to relieve said pressure, said second means including a conduit connecting said pressure tank with said diaphragm chamber, a gas tank on said conduit, a check valve on said conduit between said pressure tank opening in a direction to admit gas under pressure from said pressure tank to said chamber and said gas tank, and valve means positionable to connect said chamber to said conduit or to atmosphere, and third means preventing release of energy stored in said energy storing means while the force applied to said valve disk in valve opening direction is smaller than the force on said valve disk due to pressure in said tank, and operative to suddenly release said energy when said disk becomes unseated and starts opening said valve due to said force applied thereto in valve opening direction exceeding the force on said valve disk in valve closing direction.

2. A quick-acting valve mounted on a pressure filter having a release air trap and an air release port connected with said trap, comprising a valve seat, a valve disk normally held against said seat by the pressure in said filter and when seated on said seat sealing said port, a flexible diaphragm, rod means rigidly connecting said diaphragm and said valve disk, means forming with said diaphragm an air-tight chamber for confining a body of air compressed therein, means including a conduit leading from said release air trap to said chamber, an air tank on said conduit and a check valve on said conduit between said release air trap and said air tank for admitting air under pressure from said release air trap to said chamber and compressing it therein, and valve means operable to selectively admit air under pressure from said release air trap to said chamber and for venting said chamber.

References Cited in the file of this patent
UNITED STATES PATENTS

| | | |
|---|---|---|
| 1,087,399 | Phelps | Feb. 17, 1914 |
| 1,731,145 | MacMillin | Oct. 8, 1929 |
| 1,893,462 | Wait | Jan. 3, 1933 |
| 1,939,150 | Terry | Dec. 12, 1933 |
| 2,161,721 | Negus | June 6, 1939 |
| 2,367,260 | Beddoes | Jan. 16, 1945 |
| 2,423,172 | Booth | July 1, 1947 |
| 2,509,597 | Hamilton | May 30, 1950 |
| 2,570,132 | Koupal | Oct. 2, 1951 |
| 2,619,985 | Wilkerson | Dec. 2, 1952 |
| 2,648,490 | Messinger | Aug. 11, 1953 |

FOREIGN PATENTS

| | | |
|---|---|---|
| 74,394 | Germany | June 10, 1918 |
| 195,962 | Great Britain | Aug. 2, 1923 |
| 675,763 | Great Britain | of 1952 |